(12) United States Patent
Ahmavaara et al.

(10) Patent No.: US 7,359,347 B2
(45) Date of Patent: Apr. 15, 2008

(54) CONNECTIONS IN A COMMUNICATION SYSTEM

(75) Inventors: Kalle Ahmavaara, Helsinki (FI); Serge Haumont, Helsinki (FI); Marko Koskela, Oulu (FI); Jaakko Rajaniemi, Helsinki (FI)

(73) Assignee: Nokia Corporation, Espoo (FI)

( * ) Notice: Subject to any disclaimer, the term of this patent is extended or adjusted under 35 U.S.C. 154(b) by 907 days.

(21) Appl. No.: 10/276,827

(22) PCT Filed: May 10, 2001

(86) PCT No.: PCT/EP01/05306

§ 371 (c)(1),
(2), (4) Date: May 5, 2003

(87) PCT Pub. No.: WO01/89251

PCT Pub. Date: Nov. 22, 2001

(65) Prior Publication Data

US 2003/0169725 A1 Sep. 11, 2003

(30) Foreign Application Priority Data

May 17, 2000 (GB) .................................. 0011913.1

(51) Int. Cl.
*H04Q 7/00* (2006.01)
*H04L 12/66* (2006.01)

(52) U.S. Cl. ...................... 370/328; 370/331; 370/332; 370/352

(58) Field of Classification Search ................ 370/352, 370/230, 235, 320, 329, 331, 335, 353, 354, 370/355, 356, 357, 401, 395.4, 395.41, 395.42
See application file for complete search history.

(56) References Cited

U.S. PATENT DOCUMENTS

| | | | |
|---|---|---|---|
| 6,697,331 B1 * | 2/2004 | Riihinen et al. ............ 370/236 |
| 6,834,191 B2 * | 12/2004 | Wallentin et al. ........... 455/442 |
| 6,845,238 B1 * | 1/2005 | Muller ........................ 455/436 |
| 7,006,472 B1 * | 2/2006 | Immonen et al. ........... 370/332 |
| 7,089,009 B1 * | 8/2006 | Fauconnier ................. 455/445 |

FOREIGN PATENT DOCUMENTS

| | | |
|---|---|---|
| AU | A-78413/98 | 2/1999 |
| EP | 1 021 053 A2 | 7/2000 |
| EP | 1 049 339 A2 | 11/2000 |
| EP | 1 049 339 A3 | 1/2001 |
| EP | 1 021 053 A3 | 3/2001 |
| JP | 11-113043 | 4/1999 |
| WO | WO 98/32294 | 7/1998 |
| WO | WO 99/66740 | 12/1999 |
| WO | WO 00/54540 | 9/2000 |

OTHER PUBLICATIONS

ETSI: "Handover Requirements between UMTS and GSM or other Radio Systems (3G TS 22.129 version 3.2.0)", Technical Specification, Dec. 1999, pp. 1-20.

* cited by examiner

*Primary Examiner*—Firmin Backer
*Assistant Examiner*—Farah Faroul
(74) *Attorney, Agent, or Firm*—Squire Sanders & Dempsey L.L.P.

(57) ABSTRACT

The present invention relates to a communication system and a method for the same. In the method simultaneous circuit switched and packet switched connections are established between a user equipment and a first element of the communication system. A predefined event is monitored for after initiation of a procedure for handing the circuit switched connection over from the first element to a second element of the communication system. The event is defined to indicate a need for release of resources reserved by the packet switched connection. Subsequent to detection of the event, resources reserved by said packet switched connection at the network side of the system are released.

41 Claims, 4 Drawing Sheets

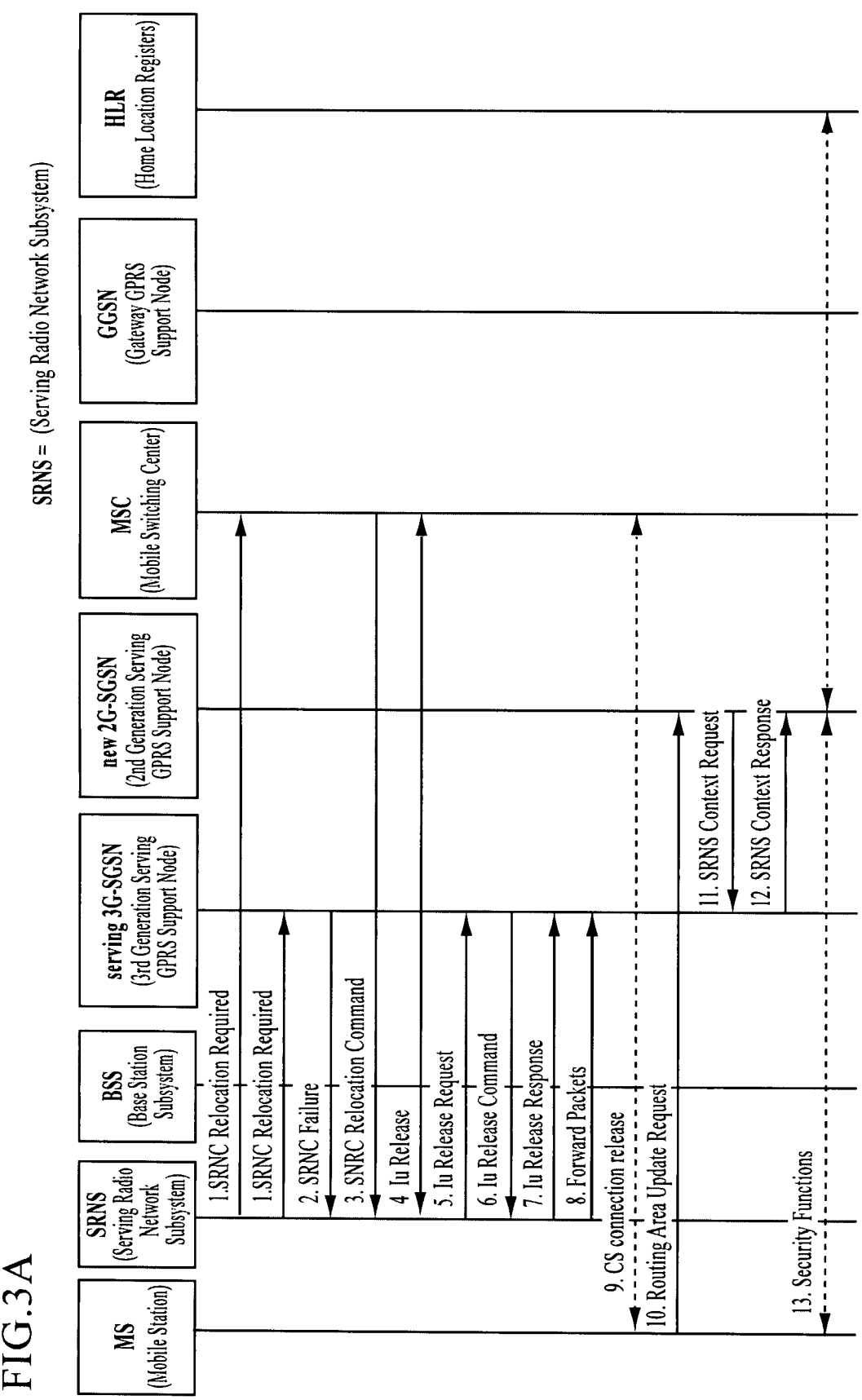

CONNECTIONS IN A COMMUNICATION SYSTEM

FIELD OF THE INVENTION

The present invention relates to connections in a communications system, and in particular, but not exclusively, to handover of connections from a node of the system to another node of the system.

BACKGROUND OF THE INVENTION

Communication networks typically operate in accordance with a given standard or specification which sets out what the various elements of the network are permitted to do and how that should be achieved, i.e. the technology on which the communication is based on in the network. The standard may define whether a user of the system or more precisely, a user equipment is provided with a circuit switched service and/or a packet switched service. The standard may also define the communication protocols which shall be used for the connection. One or more of the required connection parameters are also typically defined. In other words, the standard defines the "rules" and parameters the on which the communication within the communication system can be based on. Examples of the different standards and/or specifications defining communication technologies include, without limiting to these, specifications such as GSM (Global System for Mobile communications) or various GSM based systems (such as GPRS: General Packet Radio Service), EDGE (Enhanced Data rate for GSM Evolution), AMPS (American Mobile Phone System), DAMPS (Digital AMPS), WCDMA (Wideband Code Division Multiple Access) or CDMA (Code Division Multiple Access) or TDMA (Time Division Multiple Access) based $3^{rd}$ generation (3G) telecommunication systems. Examples of the 3G systems include Universal Mobile Telecommunication System (UMTS), i-Phone and IMT 2000 (International Mobile Telecommunication System 2000).

User equipment, such as a fixed line or wireless terminal, that is to be used for communication over a particular communication network has to be implemented in accordance with the predefined "rules" of the network. A terminal may also be arranged to be compatible with more than one technology, i.e. the terminal may communicate in accordance with several different types of communication services. These user equipment are often called as multi-mode terminals. The basic example of the multi-mode terminals is a dual-mode mobile station arranged to operate in two different telecommunications networks.

A communication network is a cellular radio network consisting of cells. In most cases the cell can be defined as a certain area covered by one or several base transceiver stations (BTS) serving user equipment (UE) via a wireless interface. The wireless interface may sometimes be referred to as a radio link. The base station forms a part of an radio access network (RAN). Several cells may cover a larger service area than one cell. In the circuit switched (CS) systems the radio service area is typically referred to as a location area (LA). In the packet switched (PS) systems the service area is often referred to as a routing area (RA). It should be appreciated that the size of the location area or routing area depends on the system and circumstances, and may equal to one cell or be even smaller, such a part of a coverage area of a base station.

The user equipment (UE) within one of the access entities (such as the cells) of the cellular system may be controlled by one or several controllers. Examples of the controller nodes include radio network controllers such as a base station controller (BSC) of the GSM system or a radio network controller (RNC) of the packet switched $3^{rd}$ generation systems and core network controllers such as a mobile switching center (MSC) of the GSM system and a serving GPRS support node (SGSN), but other control nodes may also be implemented in the network. The controller can be connected further to a gateway or linking node, for example a gateway GPRS support node (GGSN) or gateway mobile switching center (GMSC), linking the controller nodes to other parts of the communication system and/or to other communication networks, such as to a PSTN (Public Switched Telecommunications Network) or to a data network, such as to a X.25 based network or to an IP (Internet Protocol) based network. The network may also include nodes for storing information of mobile stations subscribing the network or visiting the network, such as appropriate home location registers (HLR) and visitor location registers (VLR). Depending the implementation, the register nodes may be integrated with a control node.

When user equipment communicates with a communication network, a communication path has been established between the user equipment and one or more of the elements of the network. Typically at least a part of the communication between the user equipment and a destination node or terminal then pass through the controller node.

A feature of the cellular system is that it provides mobility for the mobile stations, i.e. the mobile stations are enabled to move-from a location area to another (e.g. when the mobile station moves i.e. roams from a cell to another cell) and even from a network to another network that is compatible with the standard the mobile station is adapted to. In order to be able to provide the mobility for user equipment with an ongoing (active) connection, the system needs to be capable of accomplishing a handover of the connection from a node thereof to another node. The handover of the connection may also be required for other reasons, such as when the quality of the packet switched connection drops below a predefined threshold level or when the cell becomes too congested.

The handover should also be possible between two nodes that belong to different networks. If the new cell is not served by a similar system as the previous cell, then handover needs to be accomplished between communication systems that are based on different communication technologies. A simultaneous handover of a packet switched connection and a circuit switched connection from a terminal may also be required in some occasions.

When a handover is to be accomplished between nodes of different communications systems (i.e. systems that are based on different communication technologies), it is possible that the "new" connection cannot be properly set-up due to differences in the operation of the various elements of the "new" (i.e. target) and the "old" (i.e. previous) communication systems. For example, if a packet data communication handover is to be accomplished between two different packet data networks, such as from a third generation UMTS network to a GSM based second generation GPRS network, the user equipment (e.g. a Class B mobile station) may not be guaranteed to perform an immediate routing area update (RAU) with the controller of the new network, such as a 2G-SGSN ($2^{nd}$ generation SGSN) of the GPRS network. However, the radio network controller resources, like the RNC context and Iu bearers in the UMTS, may not be released in the old controller until the user equipment performs said routing area update (RAU) with the target (i.e.

new) SGSN in the GPRS network. At an intersystem change from the UMTS to-the GPRS an appropriate element of the UMTS system (e.g. a $3^{rd}$ generation 3G-SGSN node) releases the controller entity and Iu interface only after the user equipment has generated and send-the RAU request message. In the GSM based systems the routing area update (RAU) may be performed only after the circuit switched (CS) call is finished (i.e. the circuit switched connection is released). In addition, the $2^{nd}$ generation SGSN may not be able to remove the Iu resources between the radio network controller and the $3^{rd}$ generation SGSN, since the $2^{nd}$ generation SGSN may not have an Iu interface or a capability to control any Iu interfaces. Therefore, it may take a substantially long period of time before the RAU procedure is completed. All that time the old RNC needs to-keep the resources reserved by the packet switched connection (e.g. Iu and RNC contexts). If the routing area update is not performed immediately, these resources are unnecessarily maintained and may thus be wasted for a substantially long period of time.

SUMMARY OF THE INVENTION

The embodiments of the present invention aim to address one or several of the above problems.

According to one aspect of the present invention, there is provided a method in a communication system comprising: establishing simultaneous circuit switched and packet switched connections between a user equipment and a first element of the communication system; initiating a procedure to hand the circuit switched connection over from the first element to a second element of the communication system; monitoring for a predefined event, the event being defined to indicate a need for release of resources reserved by the packet switched connection; and subsequent to detection of the event, releasing resources reserved by said packed switched connection.

According to another aspect of the present invention there is provided a communication system comprising user equipment; a first controller, wherein simultaneous circuit switched and packet switched connections are enabled between the user equipment and the first controller; a second controller, wherein the circuit switched connection can be handed over from the first controller to the second controller; and means for detecting a predefined event, wherein the system is arranged, in response to the detection of the event, to release resources reserved by the packet switched connection.

In more specific embodiments of the invention the resources to be released comprise resources such as resources reserved by an interface between the first element and an element in the core network side of the packet switched connection and/or resources reserved in the first element by the packet switched connection. The event may comprise a request to release resources which associate with the circuit switched connection. The first element may be arranged to generate a request for release of resources in response to detection of the event. The event may be detected before the user equipment generates a request for an update of information that associates with the radio access entity serving the user equipment. The resources are released at the network side of the communication system. The resources may be resources provided by the first elements and/or communication resources between the first element and an element at the core network side of the system. The first element may be a radio network controller of a first communication network and the second element may be a radio network controller of a second communication network. The first element and the second element may operate based on different technologies. The system may comprise at least one timer for providing the triggering event. The timer function may be dynamic. Data that associates with the connection to be released may be stored in the system.

The embodiments of the invention may provide a scheme for efficient use of the resources of a communication system. Resources that may be reserved in the present proposals for substantially long periods may be released sooner than in the prior art solutions.

BRIEF DESCRIPTION OF DRAWINGS

For better understanding of the present invention, reference will now be made by way of example to the accompanying drawings in which.

DESCRIPTION OF PREFERRED
EMBODIMENTS OF THE INVENTION

Figure 1:
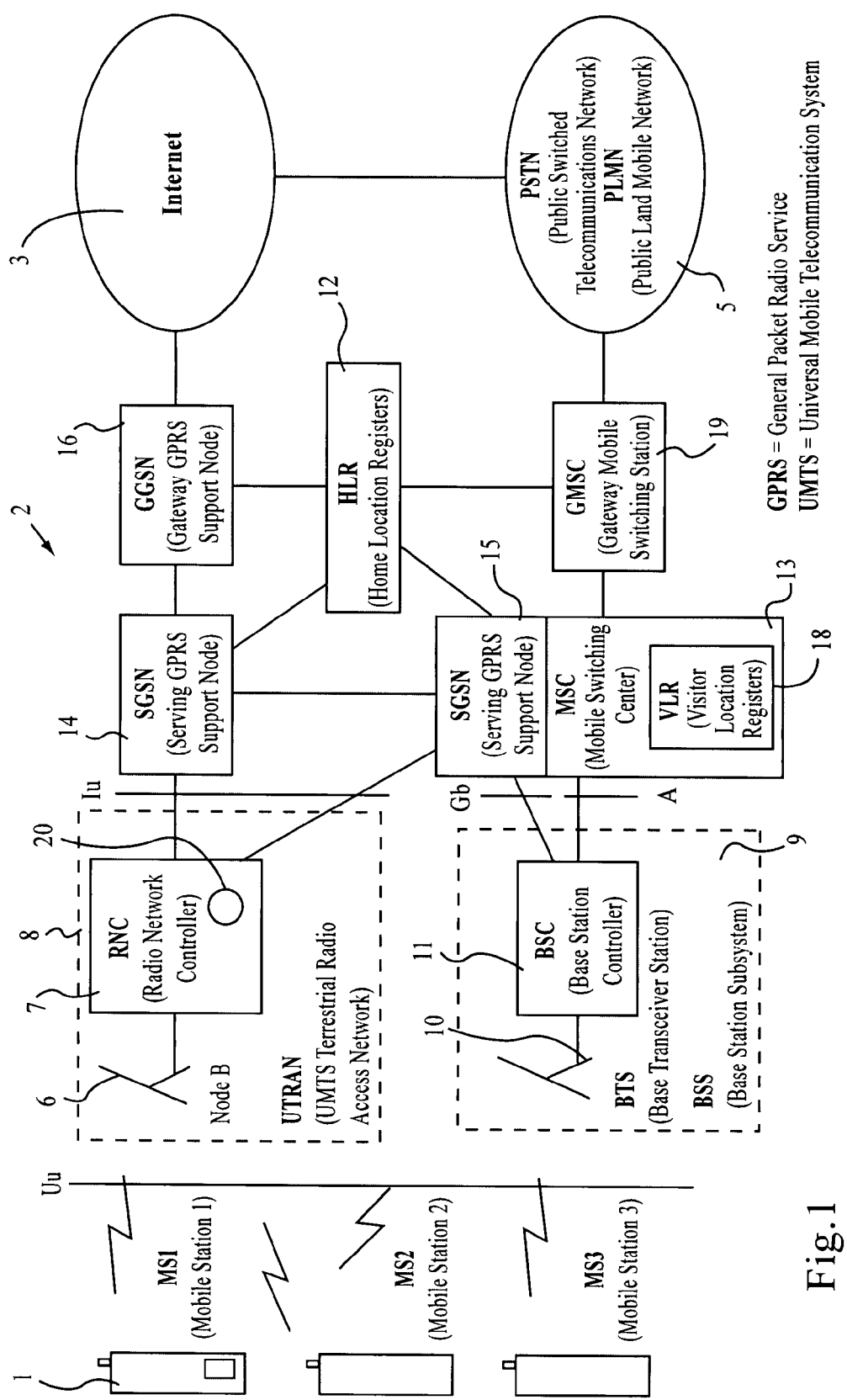
FIG. 1 shows a communication system in which an embodiment of the present invention can be implemented.

Reference is made to FIG. 1 which is a block diagram illustrating a communication system in which the present invention may be employed. That is, a cellular telecommunication system providing both packet switched (PS) service and circuit switched (CS) services for user equipment (UE). The system allows a plurality of mobile stations MS1, MS2, MS3 to communicate with base (transceiver) stations via respective wireless connections. Each base station has a radio transceiver capable of transmitting radio signals in downlink to the mobile stations within the cell area and receiving radio signals in uplink from the cell area next to the base station. By means of these signals the base station can communicate with the mobile station (MS) in that cell, which itself includes a radio transceiver.

The illustrated system comprises a core network (CN) 2, a UMTS terrestrial radio access network (UTRAN) 8, and a GSM radio access network 9. The interfaces between the various element and the core network of the system will be described in more detail below. The core network (CN) 2 can be connected to external networks, which can be either circuit switched (CS) networks 5 (e.g. public land mobile network PLMN, public circuit switched network PSTN, integrated services digital network ISDN) or packet switched (PS) networks 3 (e.g. the 25 Internet protocol (IP) based data networks).

The core network (CN) of FIG. 1 includes both UMTS elements and GSM elements. The FIG. 1 core network is composed of a Home Location Register (HLR) 12, a Mobile Services Switching Centre (MSC) 13 comprising a Visitor Location Register (VLR) 18, a Serving GPRS (General Packet Radio Service) Support Node (SGSN) 15 of the GPRS system, a Serving GPRS (General Packet Radio Service) Support Node (SGSN) 14 of the UMTS system, a Gateway GPRS Support Node (GGSN) 16, and a Gateway Mobile Services Switching Centre (GMSC) 19.

The interface between the SGSN nodes 14 and 15 of the core network and the radio access network 8 may be provided by a so called Iu interface. The BSS 9 may interface the SGSN 15 via a Gb interface. The Gb interface provides the packet switched part of the GSM system. This packet part may be provided e.g. by the GPRS. The interface between the BSS 8 and the MSC 13 for the circuit switched connections may be provided by means of an A interface.

It should be appreciated that in some systems the functions of the two SGSNs 14 and 15 may be provided by one SGSN. In this case the single SGSN may have an Iu Interface towards the UTRAN 8 and a Gb interface towards the BSS 9.

The UTRAN access network 8 may be composed of more than one radio network subsystem (RNS: not shown). Each radio network subsystem is composed of a radio network controller (RNC) 7 and one or more base stations (BTS) 6. The base stations of the UMTS network may be called to as node B, and thus this term is to be used, for clarity reasons, in the following to distinguish the UMTS base stations from the base stations of the GSM radio access network 9. The interface between the radio network controller RNC and node B may be provided by means of an Iub interface.

The mobile stations may have a radio connection with the base station 10 of the GSM access network 9 or with the Node B 6 of the UMTS access network 8. It should be appreciated that the functions of the base station BTS and the Node, B may also be implemented by means of one entity, i.e. that a base transceiver station may serve both the GSM system and the UMTS system. The main function of the Node B is to perform the air interface L1 (Layer 1) processing (channel coding and interleaving, rate adaptation, spreading, etc). It also performs some basic Radio Resource Management operation such as the inner loop power control. The operation of the Node B and the base station BTS may logically correspond to each other.

The base station BTS 10 and the Node B 6 are shown to be controlled by respective radio access network (RAN) controller nodes 11 and 7. More particularly, the radio access network controller of the UTRAN 8 is controlled by a radio network controller RNC 7. The base station subsystem (BSS) 9 of the GSM network comprises a base station controller (BSC) 11 for controlling the base station 10. The RNC 7 of the UMTS radio access network 8 and the base station controller BSC 11 of the GSM access network 9 may logically correspond to each other. The Radio Network Controller (RNC) is responsible for the control of the radio resources of the UTRAN 8. The RNC interfaces the core network (CN) 2 and also terminates the Radio Resource Control (RRC) protocol that defines the messages and procedures between the user equipment 1 and the UTRAN 8. It should be appreciated that other control nodes may also be used for the implementation of the radio network control function.

During a radio connection over the Uu interface between the mobile station 1 and the appropriate radio station, the mobile station has a connection with the respective controller node via the GSM base station 10 or the UMTS Node B 6. In FIG. 1 each of the radio access network controllers 7 and 11 may have a simultaneous packet switched and circuit switched connection with the nodes of the core network. However, it should be appreciated that in some network topologies it may be possible that an access network controller is connected only to one node of the core network.

The user equipment (UR) 1 may comprise a mobile station that is adapted to communicate via the BTS of the GMS system and also via the Node B of the UMTS system. The operation of the various functions of the mobile station may be controlled by an appropriate processor means. The user equipment may have simultaneously a packet switched connection and a circuit switched connection which may both be handed over to the new radio station. The location of the mobile station 1 could be fixed (for example if it is providing radio communications for a fixed site) or the mobile station could be moveable (for example if it is a hand portable transceiver or "mobile phone").

The user equipment 1 may be used simultaneously for a speech call with another user terminal of the network 5 via a circuit switched connection and for surfing the data network 3 via a packet switched connection. It should be noted that although the packet switched traffic and the circuit switched traffic employ each their own radio bearers, they can be seen as a logical wireless connection between the user equipment 1 and the base station 10 or node B 6. The logical connection will be controlled by the same radio network controller of the respective access network.

If the mobile station moves from one cell ("old cell") to another cell ("new cell") there is a need to hand the mobile station over from communication with the base station and associated network apparatus of the old cell to the base station and associated network apparatus of the new cell without dropping the call. It should be appreciated that there may be various other reasons than roaming for the handover, such as overload and/or congestion and/or higher priority calls forcing a handover of earlier connections with lower priority.

It is possible that the new radio access network does not support all the features of the previous access network, or that it supports different features or provides the support based on different parameters. The embodiments of the invention will address a situation where the handover occurs between the base stations of two different access networks, for example a handover of a logical connection from the UMTS radio access network 8 to the GSM radio access network 9 of FIG. 1.

Figure 2:
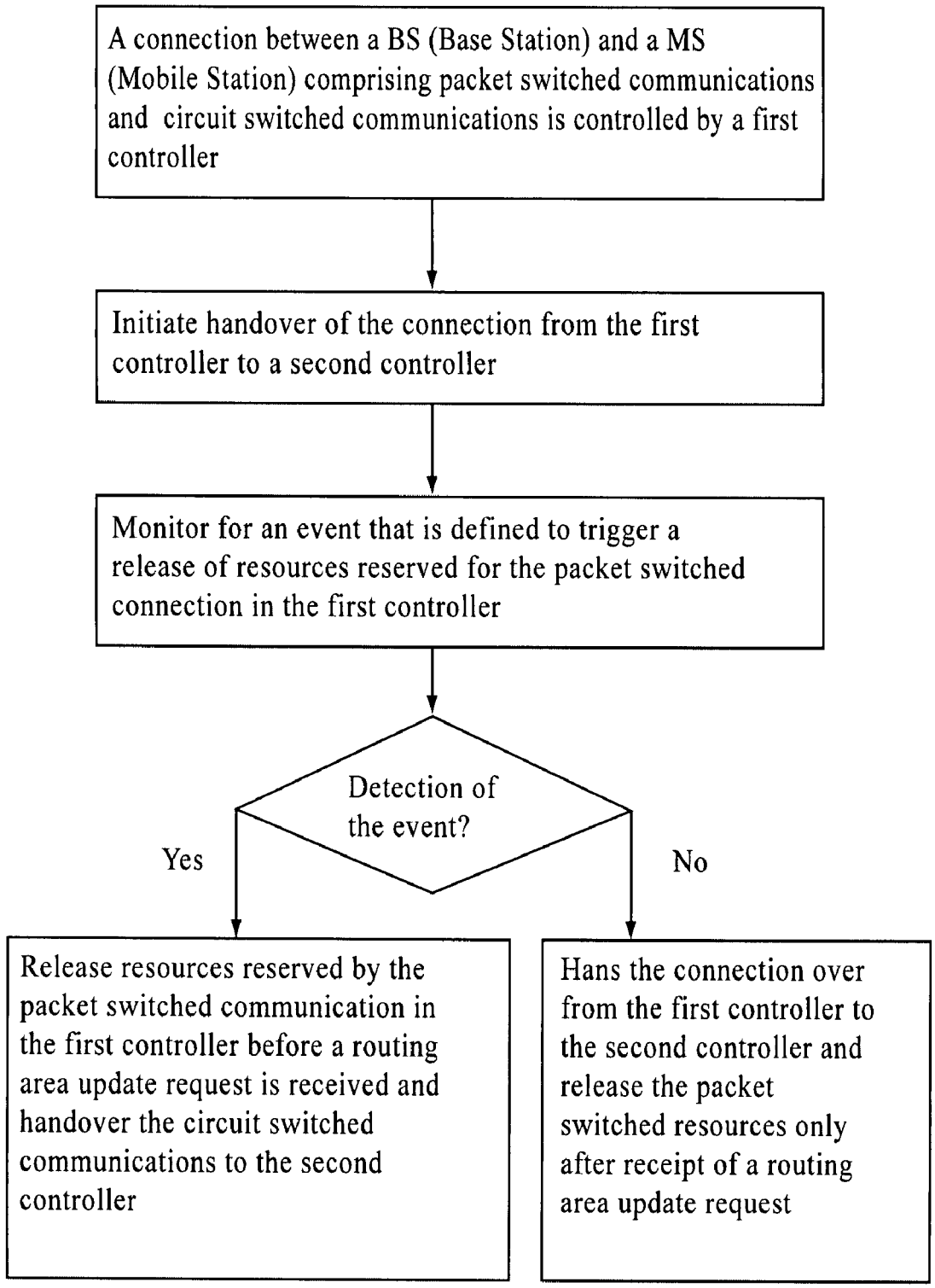
FIG. 2 is a flowchart illustrating the main steps of an embodiment of the present invention.

Referring now to the flowchart of FIG. 2, in the preferred embodiments the RNC and Iu resources are released in the beginning of an intersystem handover after detection of an event that triggers the release. Thus the RNC and/or Iu resources are not reserved for the time period they might be if the release thereof could be done only after the mobile station or another element of the system initiates the routing area update (RAU) procedure, in which case the resources could be dropped only after the prosecution of the RAU request. The monitoring of the event may be accomplished by an element that associates with the communications before the handover, e.g. by the old radio network controller or the SGSN. The monitoring may also be accomplished by an entity that associates with the control of the communications after the handover. The release of at least part of the resources may be advantageous e.g. if the packet switched connection cannot be handed over to the new controller, and/or the new controller cannot send a request to remove the existing resources reserved in the previous controller. Some of the possible event will be discussed below in the context of the exemplifying embodiments of the present invention.

With regard to the term 'connection', it should be appreciated that the same connection will continue after the handover through the new radio access network, but that it is the resources and a part of the connection (e.g. the radio part) that are then controlled by new entities. A logical connection is not necessarily dropped when Iu and RNC resources are released, but the connection is still logically kept on 'higher' layers.

According to a further embodiment data to be transported via one or more of the connections may be temporarily stored or buffered in an appropriate node of the system. The storing procedure may be started after the initiation of the handover proceedings. The data is preferably stored in a node of the core network, such as the SGSN 14 of FIG. 1, during the handover period. The data may comprise user data, such as any data that has been or is to be transported via the packet switched radio bearer to be handed over. After the connection has been successfully handed over, the stored data is transported to the new controller node and further via the new communication connection to the final destination. The data may be transported to the mobile station or to the other end of the connection, such as to a IP data network server.

It is possible to buffer all user data that is to be transported between the user terminal and the other end of the connection. However, this may not be appropriate in all occasions, for instance when the node that is indented to be used for the buffering has only limited data storage resources. In addition, it may not be possible to predict the time how long the data is to be stored, which may make the resource management of the node difficult to accomplish. Therefore it may be advantageous to buffer only that user data that has been partially send, i.e. packets of a transmission that was not completed or acknowledged by the receiving node before the initiation of the handover procedures. It is also possible to establish other predefined rules regarding the data that is to be stored, e.g. based on different priority or quality of service parameters.

An embodiment that relates to a UMTS to GPRS Inter-system change in a simultaneous mode will be described in more detail with reference to the signalling flow chart of FIG. 3. An intersystem change from a UMTS network to a GPRS network for simultaneous circuit switched and packet switched connection mode may take place e.g. when a UMTS to GSM handover is performed to the CS connection for a mobile station (MS) that is in a mode where the packet connections have resources allocated for the radio, RNC and Iu functions thereof. In the 3GPP specifications this mode is referred to as 'PMM-Connected' mode (Packet Mobility Management). In this case a mobile station in the class-A mode of operation may initiate a GPRS routing area update (RAU) procedure and a mobile station in the class-B mode of operation may initiate a GPRS routing area update procedure only after the CS connection is released in order to continue with the PS connections. The class-A mode refers to a mobile station that may handle simultaneously both the packet switched and circuit switched connections. Although the class-B mode mobile station may also provide simultaneous support for the packet switched and circuit switched connections, it may need to put the other connection on hold fore the time it is processing the other connections. For example, the class-B station may not be able to receive or transmit any new data packets while it is communicating through a circuit switched connection.

A possible sequence for the intersystem change from the UMTS to the GPRS handover for simultaneous CS and PS communication is described in the following with reference to the signalling or messaging step numbers that correspond to the message numbers of FIG. 3.

At step 1 the UTRAN decides to perform an intersystem change. Thus the UTRAN, and more particularly, the RNC controlling the connections, initiates a SRNC (serving RNC) relocation procedure for the circuit switched (CS) and packet switched (PS) connections by sending appropriate relocation request messages to the MSC node. The RNC controlling the connections, may also initiate the SRNC (serving RNC) relocation procedure for the packet switched (PS) connections by sending appropriate relocation request messages to the 3G-SGSN node. The initiation of the handover procedure may be triggered by the mobile station. For example, the initiation may be triggered based on connection quality measurement reports received from the mobile station.

According to a possibility the 3G-SGSN node serving the mobile determines that the requested relocation of the packet switched connection cannot be performed (for example, the new node i.e. the target 2G-SGSN does not support the PS connection), and therefore rejects the SRNC relocation by sending a 'SRNC Relocation Failure' (Relocation Not Supported) message 2 back to the "old" RNC. The decision may be based on information stored in the 3G-SGSN, e.g. in the form of a table, regarding the possible nodes that support and/or do not support the packet switched connection. The 3G-SGSN may also send a message to the new 2G-SGSN for obtaining confirmation whether the 2G-SGSN may provide support for the packet switched connection or not.

The circuit switched connection relocation is supported, and thus the MSC sends a 'Relocation Command' message 3 to the old RNC to inform that resources for the relocation are allocated in the target base station subsystem (BSS). The old RNC may then send a 'Handover Command' to the mobile station.

After an inter-system handover has been performed for the CS connection the MSC may send an 'Iu Release Command' at message step 4. The SRNS responds with an 'Iu Release Complete' message. These messages are indicated by the double headed arrow 4 in FIG. 3. The message 4 requesting for the release of Iu resources triggers the SRNC to generate and send an 'Iu Release Request' (CS Handover to the GSM system) 5 to the 3G-SGSN. In the FIG. 3 embodiment the receipt of message 5 then triggers the release of the resources. To release the resources, the 3G-SGSN sends an 'Iu Release Command' message 6 to the RNC of the SRNS. Upon reception of this message the SRNS may buffer and stop sending downlink PDUs (Protocol Data Units) to the MS and returns an 'SRNS Context Response' (this may include information such as an IMSI (International Mobile Subscriber Identity), GTP-SNDs (GPRS Tunnelling Protocol—downlink sequence number), GTP-SNUs (uplink sequence number), PDCP-SNDs (Packet Data Compression Protocol—downlink sequence number), PDCP-SNUs message 7. The SRNS shall include for each PDP context the next in-sequence a GTP sequence number to be sent to the mobile station and the GTP sequence number of the next uplink packet data unit (PDU) to be tunnelled to the gateway node (e.g. the GGSN).

The term 'PDP context' refers to the part of the data connection or data bearer that goes through the packet switched network (e.g. the GPRS/UMTS network). The PDP context can be seen as a logical connection from the wireless station to the access point of a gateway node, such as the GGSN, the access point being the connection point between the e.g. GPRS/UMTS mobile network and an external data network. The PDP context may also be referred to, instead of the term logical connection, as a logical association between the access point and the user.

For each active PDP context using acknowledged mode, the SRNS may also include the uplink PDCP sequence number (PDCP-SNU) and the downlink PDCP sequence number (PDCP-SND). PDCP-SNU shall be the next in-sequence PDCP sequence number expected from the MS (per each active radio bearer). PDCP-SND shall be the next in-sequence PDCP sequence number to be sent to the mobile station (per each active radio bearer). Because the PDCP sequence number is typically 8 bits long, the PDCP sequence number is equal to a SNDCP PDCP-PDU number (in the acknowledged mode).

At messaging stage 8 the SRNS may start tunnelling the partly transmitted and the transmitted but not acknowledged N-PDUs (Network PDUs) together with the PDCP downlink sequence number of the last PDCP segment of that N-PDU, and start duplicating and tunnelling the buffered GTP PDUs to the 3G-SGSN. At stage 9 the circuit switched connection may be released between the MSC and the mobile station.

It is only now when the mobile station may send a 'Routing Area Update Request' message 10 to the new 2G-SGSN. Therefore the above described message 5 may expedite the release of the resources in an earlier stage of the handover procedure as in the prior art solutions.

For the sake of completeness, the following will describe the next stages of the handover procedures so as to clarify length and various steps of the of the handover procedure. Message 10 may include information such as the old RAI (routing area identity), old P-TMSI Signature (Packet—Temporary Mobile Subscriber Identity), and the Update Type. The Update Type may indicate whether the update is a requested RA update or a periodic RA update. The BSS may add to the message a Cell Global Identity (CGI) including the RAC (Routing Area Code: for the packet switched connection) and LAC (Location Area Code: for the circuit switched connection) of the cell where the message was received before passing the message to the new 2G-SGSN.

The new 2G-SGSN sends an 'SGSN Context Request' (including old RAI, TLLI (Temporary Logical Link Identity), old P-TMSI Signature, New SGSN Address) message 11 to the old 3G-SGSN to get the MM context and PDP context for the mobile station. The MM context comprises a GPRS mobility management information entity containing subscriber related information such as the IMSI, encryption keys and so on. The old SGSN may then validate the old P-TMSI Signature and may respond with an appropriate error cause if the signature does not match the value stored in the old 3G-SGSN. The old 3G-SGSN may also start a timer. If the mobile station is not known in the old 3G-SGSN, the old 3G-SGSN may respond with an appropriate error cause.

Figure 3B:
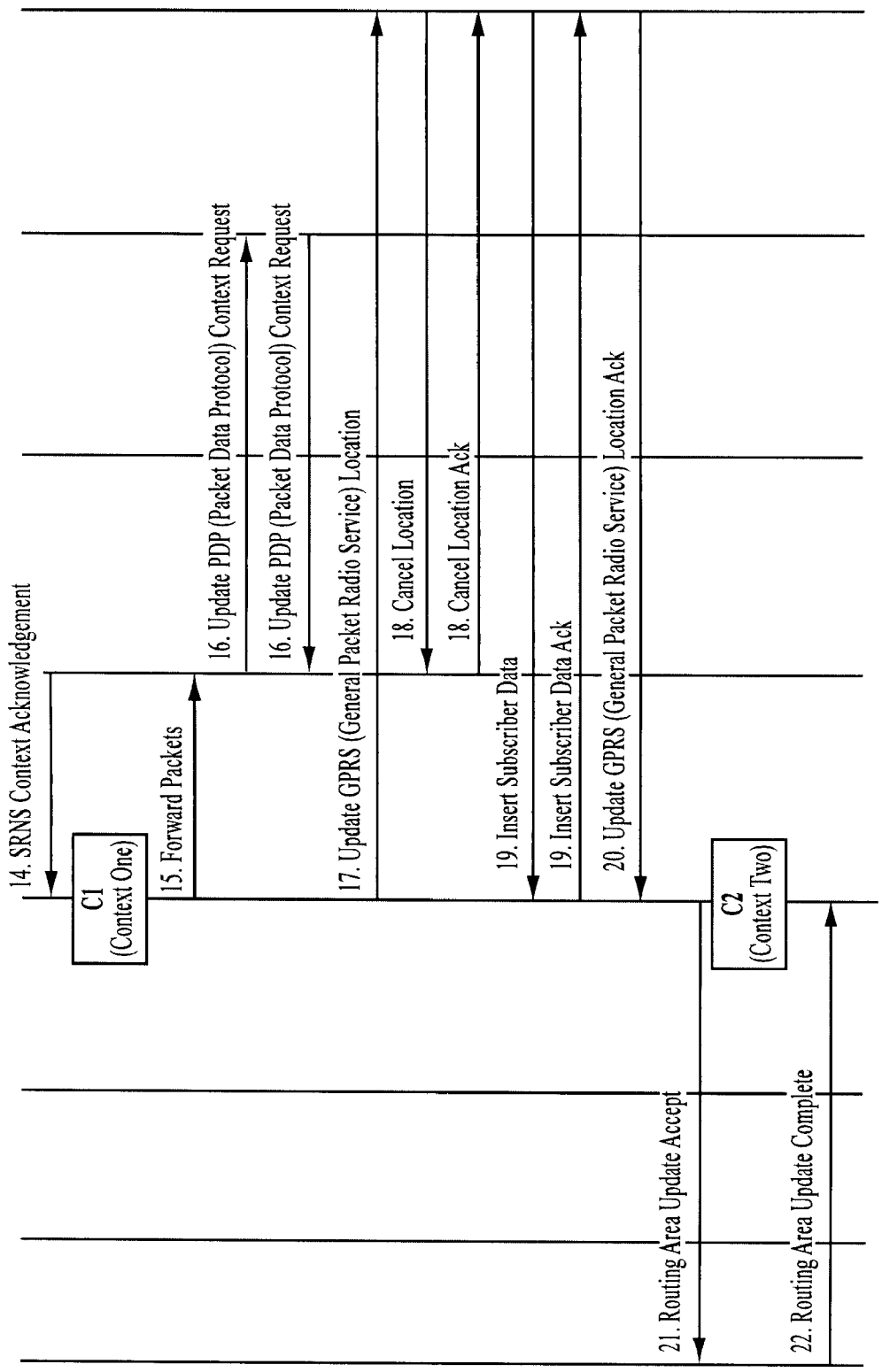
FIG. 3 is a signalling chart illustrating in detail message flows in accordance with an embodiment of the present invention.

In the FIG. 3 embodiment the old 3G-SGSN responds with an 'SGSN Context Response' (including the MM Context and the PDP Context) message 12. For each PDP context the old 3G-SGSN may include the GTP sequence number for the next uplink GTP PDU to be tunnelled to the GGSN and the next donwlink GTP sequence number for the next in-sequence N-PDU to be sent to the MS. Each PDP Context may include a SNDCP (GPRS Subnetwork Dependent Convergence Protocol) 'Send N-PDU Number' request for the next in-sequence downlink N-PDU to be sent in an acknowledged mode to the mobile station and the SNDCP 'Receive N-PDU Number' request for the next in-sequence uplink N-PDU to be received in acknowledged mode from the mobile station.

Appropriate security functions may be executed at stage 13. The security function may include various verification and/or authentication procedures wherein user data may be verified against the data stored in the HLR of the user.

After the security functions have confirmed that the connection may continue, the new 2G-SGSN may send an 'SGSN Context Acknowledge' message 14 to the old 3G-SGSN. This informs the old 3G-SGSN that the new 2G-SGSN is ready to receive data packets belonging to the activated PDP contexts. The old SGSN marks in its context that the MSC/VLR association and the information in the GGSNs and the HLR are invalid. The marking may be used to trigger the MSC/VLR, the GGSNs, and the HLR to be updated if the mobile station initiates a RA update procedure back to the old SGSN before completing the ongoing RA update procedure.

If the buffering of data is employed, the old 3G-SGSN may duplicate the buffered N-PDUs and start tunnelling them to the new 2G-SGSN at messaging stage 15. Additional N-PDUs received from the GGSN may also be duplicated and tunnelled to the new SGSN. The duplication may be accomplished before a timer function that may have been described in the message step 2 expires. The N-PDUs that were already sent to the mobile station in the acknowledged mode and that are not yet acknowledged by the mobile station are tunnelled together with the SNDCP N-PDU number. No N-PDUs may be forwarded to the new SGSN after the expiry of said timer. The old 3G-SGSN tunnels the GTP PDUs to the new 2G-SGSN. The SNDCP sequence numbers shall not be modified in the GTP header of the tunnelled PDUs.

The new 2G-SGSN may then send an 'Update PDP Context Request' (new SGSN Address, TEID, QoS Negotiated) message at stage 16 to each of the GGSNs that associate with the connection. Each GGSN may then update their PDP context fields and return an 'Update PDP Context Response' (TEID) message.

The new 2G-SGSN typically informs the HLR of the change of SGSN by sending an 'Update GPRS Location' message 17 to the HLR. The message 17 may include e.g. SGSN Number, SGSN Address, and the IMSI of the mobile station. In response, the HLR sends a 'Cancel Location (IMSI)' message at stage 18 to the old 3G-SGSN. The old 3G-SGSN may then acknowledge this with a 'Cancel Location Ack (IMSI)' message. The old 3G-SGSN removes the MM and PDP contexts if a timer that may have been described in message step 3 is not running. If the timer is running then the MM and PDP contexts shall be removed when the timer expires. The timer function may be implemented in the old RNC of the old RNS, or in the 3G-SGSN.

At stage 19 the HLR may send an 'Insert Subscriber Data' (e.g. IMSI and/or GPRS Subscription Data) message to the new 2G-SGSN. The new 2G-SGSN constructs an MM context and an PDP context for the mobile station and returns an 'Insert Subscriber Data Ack' (including the IMSI) message to the HLR.

The HLR acknowledges the 'Update GPRS Location' message by returning an 'Update GPRS Location Ack' (IMSI) message 20 to the new 2G-SGSN. The new 2G-SGSN may then validate the presence of the mobile station (MS) in the new routing area (RA). If the mobile station is not allowed to be attached in the new 2G-SGSN (e.g. due to roaming restrictions) or if the authentication of the subscription fails, then the new 2G-SGSN may reject the routing area update with an appropriate cause. If all checks are successful then the new 2G-SGSN may construct MM and PDP contexts for the mobile station. A logical link is thereafter established between the new 2G-SGSN and the mobile station. The new 2G-SGSN responds to the mobile station with a 'Routing Area Update Accept' message 21. This message may include information such as the P-TMSI, P-TMSI Signature, and/or Receive N-PDU Number. Receive N-PDU Number contains the acknowledgements for each acknowledged-mode NSAPI (Network layer Service Access Point Identifier) used by the mobile station, thereby confirming that all mobile-originated N-PDUs are successfully transferred before the start of the update procedure.

The MS acknowledges the new P-TMSI by returning a 'Routing Area Update Complete' (Receive N-PDU Number) message 22 to the SGSN. Received N-PDU Number message contains the acknowledgements for each acknowledged-mode NSAPI used by the mobile station, thereby confirming all mobile-terminated N-PDUs successfully transferred before the start of the update procedure. The MS deducts Receive N-PDU number from the downlink RLC (Radio Link Control) sequence number by stripping off the four most significant bits of the RLC sequence number of the next expected in-sequence RLC frame.

For a mobile station with GPRS-CSI defined, customised applications for mobile network enhanced logic (CAMEL) interaction may be performed. For a more detailed description thereof, see $3^{rd}$ Generation Partnership Project specification No. 3G TS 23.078. If such a mobile station is used, the C1 box designates 'CAMEL-GPRS-SGSN-Context-Acknowledge' message and the C2 box designates 'CAMEL-GPRS-Routing-Area-Update' message:

The messaging steps 1-7 may alternatively be accomplished such that the source RNC directly releases the Iu connection to the 3G-SGSN when it has noticed that the circuit switched connection has been successfully handed over. The release may also be done before the handover of the circuit switched connection or during the handover proceedings. The radio network controller 7 of FIG. 7 can be made aware that the mobile station 1 has been handed over to another node that operates in accordance with a GSM standard or other standard not supporting the UMTS packet switched service, and may thus initiate the release of the packet switched resources.

The radio network controller may also be provided with a timer function which releases the Iu and RNC if there is no activity in a predefined period of time. In FIG. 1 the timer function is designated by 20. The timer 20 may be used to provide the event for triggering the release of e.g. the Iu interface resources or other resources reserved by the packet switched part if the logical connection is to be handed over from the UMTS to the GPRS system. The timer function 20 may provide a predefined indication to the radio network controller, the indication triggering the release procedure. The radio network controller may not need to have any beforehand information of the handover, but may initiate the release solely based on information from the timer 20.

The timer may have a fixed expiry period, e.g. such that after a predefined time period (e.g. 10 or 20 minutes) within which there has been no activity in the packet switched side of the logical connection the timer function will provide the indication. According to an alternative the timer function is dynamic. The adjustment of the timer (e.g. the expiry period) may be based on information of the available resources. The timer may also have different setting depending on the time of the day, week, year and so on. The network operator may change the settings of the timer.

The timer function may alternatively be provided in the SGSN 14 of FIG. 1. According to an embodiment the RNC 7 and the SGSN 14 are both provided with timer functions. The operation of the latter embodiment may be such that the first timer expiry provides the event. According to another possibility the latest of the timers to expire provides the event that triggers the release of the resources.

It is also possible to have a system which may initiate the release procedure based on more than one event. The arrangement may be such that more than one event is required before initiation of the release,procedure. The arrangement may be such that that the release of resources is always initiated when any one of the predefined events is detected.

It should be appreciated that whilst embodiments of the present invention have been described in relation to mobile stations, embodiments of the present invention are applicable to any other suitable type of user equipment.

The term circuit switched is intended to refer to any communications that is based on connection oriented communications. The term packet switched is intended to refer to any communications that can be considered as "connectionless" (i.e. no circuit is set-up for the communication, but the data units to be transported in the system are provided with an address).

The data is described as being in packet form. In alternative embodiments of the invention the data may be sent in any suitable format. Data to be transmitted between the user equipment and the radio stations, respectively, may be speech data, video data or other data. Any packet data transmission may be encoded into a form suitable for transmission at a bit rate which is dependent on the application and the source of the data.

The embodiment of the present invention has been described in the context of a UMTS and GSM systems. This invention is also applicable to any other communication network where the connection may be handed over between two or more nodes.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
establishing simultaneous circuit switched and packet switched connections between an user equipment and a first network element of the communication system;
initiating a procedure to hand the circuit switched connection over from the first network element to a second network element of the communication system;
monitoring for a predefined event, the event being defined to indicate a need for release of resources reserved by the packet switched connection;
detecting the event before the user equipment generates a request for an update of information that is associated with a radio access entity serving the user equipment; and
subsequent to detection of the event, releasing resources reserved by said packet switched connection.

2. The method of claim 1, wherein releasing the resources comprises releasing resources that were reserved by an interface between the first network element and an element in the core network side of the packet switched connection.

3. The method of claim 1, wherein releasing the resources comprises releasing resources that were reserved in the first network element by the packet switched connection.

4. The method of claim 1, wherein the detecting the event before the user equipment generates the request comprises detecting the event before the user equipment generates a request for routing area update.

5. The method of claim 1, wherein the initiating the procedure to hand the circuit switched connection over from the first network element to the second network element of the communication system comprises initiating the procedure to hand the circuit switched connection over from a radio network controller of a first communication network to a radio network controller of a second communication network.

6. The method of claim 1, wherein the initiating the procedure to hand the circuit switched connection over from the first network element to the second network element of the communication system comprises initiating the procedure to hand the circuit switched connection over from the first network element to the second network element of the communication system while the first network element and the second network element operate based on different technologies.

7. The method of claim 5, wherein the initiating the procedure to hand the circuit switched connection over from the first network element to the second network element of the communication system comprises initiating the procedure to hand the circuit switched connection over from a radio network controller of a third generation cellular telecommunications system.

8. The method of claim 5, wherein the initiating the procedure to hand the circuit switched connection over from the first network element to the second network element of the communication system comprises initiating the procedure to hand the circuit switched connection over from the first network element to a radio network controller of a second generation cellular telecommunications system.

9. The method of claim 1, wherein the releasing the resources reserved by said packet switched connection subsequent to detection of the event comprises releasing the resources reserved by said packet switched connection subsequent to detection of a request to release resources associated with the circuit switched connection.

10. The method of claim 9, wherein the releasing the resources reserved by said packet switched connection subsequent to detection of the event comprises releasing the resources reserved by said packet switched connection subsequent to detection of a recluest that is generated by an element of the core network of the communication system.

11. The method of claim 1, further comprising:
generating, by the first network element, a request for release of resources in response to detection of the event.

12. The method of claim 1, wherein the releasing the resources reserved by said packet switched connection subsequent to detection of the event comprises releasing the resources reserved by said packet switched connection subsequent to detection of a decision to release the resources, wherein said decision is based on information of capabilities of the communication network to which the second network element belongs.

13. The method of claim 12, wherein the releasing the resources reserved by said packet switched connection subsequent to detection of the decision to release the resources based on said information comprises releasing the resources reserved by said packet switched connection subsequent to detection of the decision to release the resources based on information retrieved from a table.

14. The method of claim 12, wherein the releasing the resources reserved by said packet switched connection subsequent to detection of the event comprises releasing the resources reserved by said packet switched connection subsequent to detection of a decision base on information obtained by transporting an inquiry in the communication network of the second network element.

15. The method of claim 12, wherein the releasing the resources reserved by said packet switched connection subsequent to detection of the event comprises releasing the resources reserved by said packet switched connection subsequent to detection of a decision made by the first network element.

16. The method of claim 12, wherein the releasing the resources reserved by said packet switched connection subsequent to detection of the event comprises releasing the resources reserved by said packet switched connection subsequent to detection of a decision made by a controller in the core network of the communication system.

17. The method of claim 1, wherein the releasing the resources reserved by said packet switched connection subsequent to detection of the event comprises releasing the resources reserved by said packet switched connection subsequent to detection of an indication from a timer function.

18. The method of claim 17, wherein the releasing the resources reserved by said packet switched connection subsequent to detection of the event comprises releasing the resources reserved by said packet switched connection subsequent to detection of the indication from a timer function is implemented in the first network element.

19. The method of claim 17, wherein the releasing the resources reserved by said packet switched connection subsequent to detection of the event comprises releasing the resources reserved by said packet switched connection subsequent to detection of the indication from a timer function implemented in the core network side of the communication system.

20. The method of claim 17, wherein the releasing the resources reserved by said packet switched connection subsequent to detection of the event comprises releasing the resources reserved by said packet switched connection subsequent to detection of the indication from a timer function that is dynamic.

21. The method of claim 1, further comprising:
storing data that is associated with the connection to be released.

22. The method of claim 21, wherein the storing the data comprises storing user data.

23. The method of claim 21, wherein the storing the data comprises storing only predefined data.

24. The method of claim 23, wherein the storing the data comprises storing only such data as has been transmitted before the initiation of the handover but that has not been acknowledged as received by the time of initiation of the handover.

25. The method of claim 21, further comprising:
transporting the stored data to an addressed destination after completion of the handover procedure.

26. A communication system, comprising:
user equipment;
a first network element, wherein simultaneous circuit switched and packet switched connections are enabled between the user equipment and the first network element;
a second network element, wherein the circuit switched connection is configured to be handed over from the first network element to the second network element; and
a detection unit configured to detect a predefined event, wherein the system is configured, in response to the detection of the event, to release resources reserved by the packet switched connection,
wherein the system is further configured to detect the event before the user equipment generates a request for an update of information associated with a radio access entity serving the user equipment.

27. The communication system of claim 26, wherein the resources to be released comprise resources reserved by an interface between the first network element and a network element in the core network of the system.

28. The communication system of claim 26, wherein the system is configured to release resources in the first network element.

29. The communication system of claim 26, wherein the first network element is a radio network controller of a first communication network and the second network element is a radio network controller of a second communication network.

30. The communication system of claim 26, wherein the first network element and the second network element are configured to operate based on different technologies.

31. The communication system of claim 26, wherein the first network element is configured to generate a request to release the resources in response to a message that is associated with the circuit switched connection.

32. The communication system of claim 31, wherein said message comprises a request to release circuit switched resources.

33. The communication system of claim 26, wherein the event comprises a decision to release the resources, wherein said decision is based on information of capabilities of the communication network to which the second network element belongs.

34. The communication system of claim 26, wherein the first network element is configured to make the decision to release the resources.

35. The communication system of claim 26, wherein a controller in the core network of the communication system is configured to make the decision.

36. The communication system of claim 26, further comprising:
at least one timer.

37. The communication system of claim 36, wherein the at least one timer is dynamic.

38. The communication system of claim 26, further comprising:
a memory configured to store data that is associated with the connection to be released.

39. A communication system, comprising:
user equipment;
a first network element, wherein simultaneous circuit switched and packet switched connections are enabled between the user equipment and the first network element;
a second network element, wherein the circuit switched connection can be handed over from the first network element to the second network element; and
detection means for detecting a predefined event, wherein the system is configured, in response to the detection of the event, to release resources reserved by the packet switched connection,
wherein the detection means is configured to detect the predefined event before the user equipment generates a request for an update of information associated with a radio access entity service the user equipment.

40. The communication system of claim 39, further comprising:
memory means for storing data that is associated with the connection to be released.

41. a detection unit for use in a communication system having simultaneous circuit switched and packet switched connections between a user equipment and a first network element, the detection unit being configured to:
monitor for a predefined event, the event being defined to indicate a need for release of resources reserved by the packet switched connection when a procedure to hand the circuit switched connection over from the first network element to a second network element of the communication system is initiated; and
detect the predefined event before the user equipment generates a request for an update of information associated with a radio access entity serving the user equipment.

\* \* \* \* \*